United States Patent
Chmiel et al.

(10) Patent No.: US 9,218,181 B1
(45) Date of Patent: *Dec. 22, 2015

(54) AUTOMATIC SOFTWARE CATALOG CONTENT CREATION BASED ON BIO-INSPIRED COMPUTING PREDICTION

(71) Applicant: International Business Machines Corporation, Armonk, NY (US)

(72) Inventors: Krystian N. Chmiel, Kraków (PL); Marcin D. Gierlak, Kraków (PL); Piotr Kania, Kraków (PL); Michal Paluch, Kraków (PL); Tomasz L. Prudzic, Kraków (PL); Patryk M. Walawender, Kraków (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/471,650

(22) Filed: Aug. 28, 2014

Related U.S. Application Data

(63) Continuation of application No. 14/306,273, filed on Jun. 17, 2014.

(51) Int. Cl.
G06F 9/44 (2006.01)
G06F 9/445 (2006.01)

(52) U.S. Cl.
CPC .. *G06F 8/71* (2013.01); *G06F 8/20* (2013.01); *G06F 8/30* (2013.01); *G06F 8/65* (2013.01)

(58) Field of Classification Search
CPC ............... G06F 8/10–8/30; G06F 8/70–8/75; G06F 8/65
See application file for complete search history.

(56) References Cited

U.S. PATENT DOCUMENTS 7,076,496 B1 * 7/2006 Ruizandrade ............. G06F 8/71
707/695
7,941,377 B2 5/2011 Cognigni et al.
(Continued)

OTHER PUBLICATIONS

Liliana Rosa, Self-management of Adaptable Component-based Applications, 2009, pp. 1-18.*

(Continued)

*Primary Examiner* — Thuy Dao
*Assistant Examiner* — Mongbao Nguyen
(74) *Attorney, Agent, or Firm* — Patricia B. Feighan; Joseph Petrokaitis

(57) ABSTRACT

A method for automatically creating a software catalog content that includes a plurality of software components associated with a computing system is provided. The method may include creating a population comprising a plurality of potential software signatures associated with the plurality of software components. The method may include ranking the population comprising the potential software signatures based on a highest ratio value. The method may include selecting a set of parent software signatures based on the ranking. Additionally, the method may include creating a new population of potential software signatures based on the selected set of parent software signatures. The method may include performing recombination on the new population of potential software signatures. Furthermore, the method may include predicting at least one potential software signature from the new population of potential software signatures based on a comparison between the performed recombination and the created new population of potential software signatures.

6 Claims, 4 Drawing Sheets

(56) References Cited

U.S. PATENT DOCUMENTS

| | | | |
|---|---|---|---|
| 8,307,341 B2 | 11/2012 | Eykholt | |
| 8,521,865 B2 | 8/2013 | D'Alo et al. | |
| 8,539,445 B2 | 9/2013 | Gangemi et al. | |
| 8,601,467 B2* | 12/2013 | Hofhansl | G06F 8/60 717/120 |
| 2003/0192029 A1* | 10/2003 | Hughes | G06F 8/20 717/101 |
| 2004/0117783 A1* | 6/2004 | Kaminsky | G06F 8/71 717/169 |
| 2006/0184890 A1* | 8/2006 | Altenhofen | 715/764 |
| 2007/0234316 A1* | 10/2007 | Bayerlein | G06F 9/44547 717/140 |
| 2008/0040705 A1* | 2/2008 | Jeong | 717/122 |
| 2008/0228744 A1 | 9/2008 | Desbiens | |
| 2008/0250038 A1 | 10/2008 | Di Litta et al. | |
| 2009/0210852 A1* | 8/2009 | Martineau | 717/101 |
| 2010/0083248 A1* | 4/2010 | Wood et al. | 718/1 |
| 2011/0225114 A1* | 9/2011 | Gotthardt | 706/50 |
| 2011/0271246 A1* | 11/2011 | Fujihara | G06F 8/20 717/104 |
| 2012/0017207 A1* | 1/2012 | Mahajan | G06F 8/43 717/173 |
| 2012/0054728 A1* | 3/2012 | Rohde | G06F 8/71 717/168 |
| 2013/0305239 A1 | 11/2013 | Traut et al. | |
| 2014/0019933 A1* | 1/2014 | Balasubramanian | G06Q 10/06 717/102 |
| 2014/0047409 A1* | 2/2014 | Yang | G06F 8/20 717/105 |
| 2014/0068551 A1* | 3/2014 | Balasubramanian et al. | 717/107 |
| 2014/0156474 A1* | 6/2014 | Swain et al. | 705/30 |
| 2014/0165034 A1* | 6/2014 | Balasubramanian | G06F 8/71 717/121 |
| 2014/0173454 A1* | 6/2014 | Sanchez | G06F 3/0484 715/747 |

OTHER PUBLICATIONS

Christoph Becker, Improving decision support for software component selection through systematic cross-referencing and analysis of multiple decision criteria, 2013, pp. 1-10.*

Debayan Bose, Component based development, Application in Software Engineering, 2010, pp. 1-20.*

Anonymous, "Automatic recognition of missing signatures for upgraded software products", IP.com, Jan. 8, 2014, pp. 1-4, IPCOM000234030D.

Chmiel, et al., "Automatic Software Catalog Content Creation Based on Bio-Inspired Computing Prediction", U.S. Appl. No. 14/306,273, filed Jun. 17, 2014, 26 pages.

* cited by examiner

AUTOMATIC SOFTWARE CATALOG CONTENT CREATION BASED ON BIO-INSPIRED COMPUTING PREDICTION

CROSS REFERENCE

The present application is a continuation of and claims priority under 35 U.S.C. §120 of U.S. patent application Ser. No. 14/306,273 filed on Jun. 17, 2014, which is incorporated by reference in its entirety.

FIELD OF THE INVENTION

The present invention relates generally to the field of computing, and more particularly to software products catalog content.

BACKGROUND

Most of the currently used software asset management (SAM) solutions use some form of software catalog containing signature definitions that allow for software discovery. The signatures may be a file, registry entries, or other identifiers that act as fingerprints for identifying software products, and may be augmented with information about custom or proprietary software products in an information technology (IT) environment. Some software vendors may have internal processes that may automatically build the catalog content for their software.

SUMMARY

According to one embodiment, a method for automatically creating a software catalog content that includes a plurality of software components associated with a computing system is provided. The method may include creating a population comprising a plurality of potential software signatures associated with the plurality of software components. The method may further include ranking the population comprising the potential software signatures based on a highest ratio value. The method may also include selecting a set of parent software signatures based on the ranking. Additionally, the method may include creating a new population of potential software signatures based on the selected set of parent software signatures. The method may also include performing recombination on the new population of potential software signatures. Furthermore, the method may include predicting at least one potential software signature from the new population of potential software signatures based on a comparison between the performed recombination and the created new population of potential software signatures.

According to another embodiment, a computer system for automatically creating a software catalog content that includes a plurality of software components associated with a computing system is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include creating a population comprising a plurality of potential software signatures associated with the plurality of software components. The method may further include ranking the population comprising the potential software signatures based on a highest ratio value. The method may also include selecting a set of parent software signatures based on the ranking. Additionally, the method may include creating a new population of potential software signatures based on the selected set of parent software signatures. The method may also include performing recombination on the new population of potential software signatures. Furthermore, the method may include predicting at least one potential software signature from the new population of potential software signatures based on a comparison between the performed recombination and the created new population of potential software signatures.

According to yet another embodiment, a computer program product for automatically creating a software catalog content that includes a plurality of software components associated with a computing system is provided. The computer program product may include one or more computer-readable tangible storage medium and program instructions stored on at least one of the one or more tangible storage medium, the program instructions executable by a processor. The computer program product may include program instructions to create a population comprising a plurality of potential software signatures associated with the plurality of software components. The computer program product may further include program instructions to rank the population comprising the potential software signatures based on a highest ratio value. The computer program product may also include program instructions to select a set of parent software signatures based on the ranking. Additionally, the computer program product may include program instructions to create a new population of potential software signatures based on the selected set of parent software signatures. The computer program product may also include program instructions to perform recombination on the new population of potential software signatures. Furthermore, the computer program product may include program instructions to predict at least one potential software signature from the new population of potential software signatures based on a comparison between the performed recombination and the created new population of potential software signatures.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
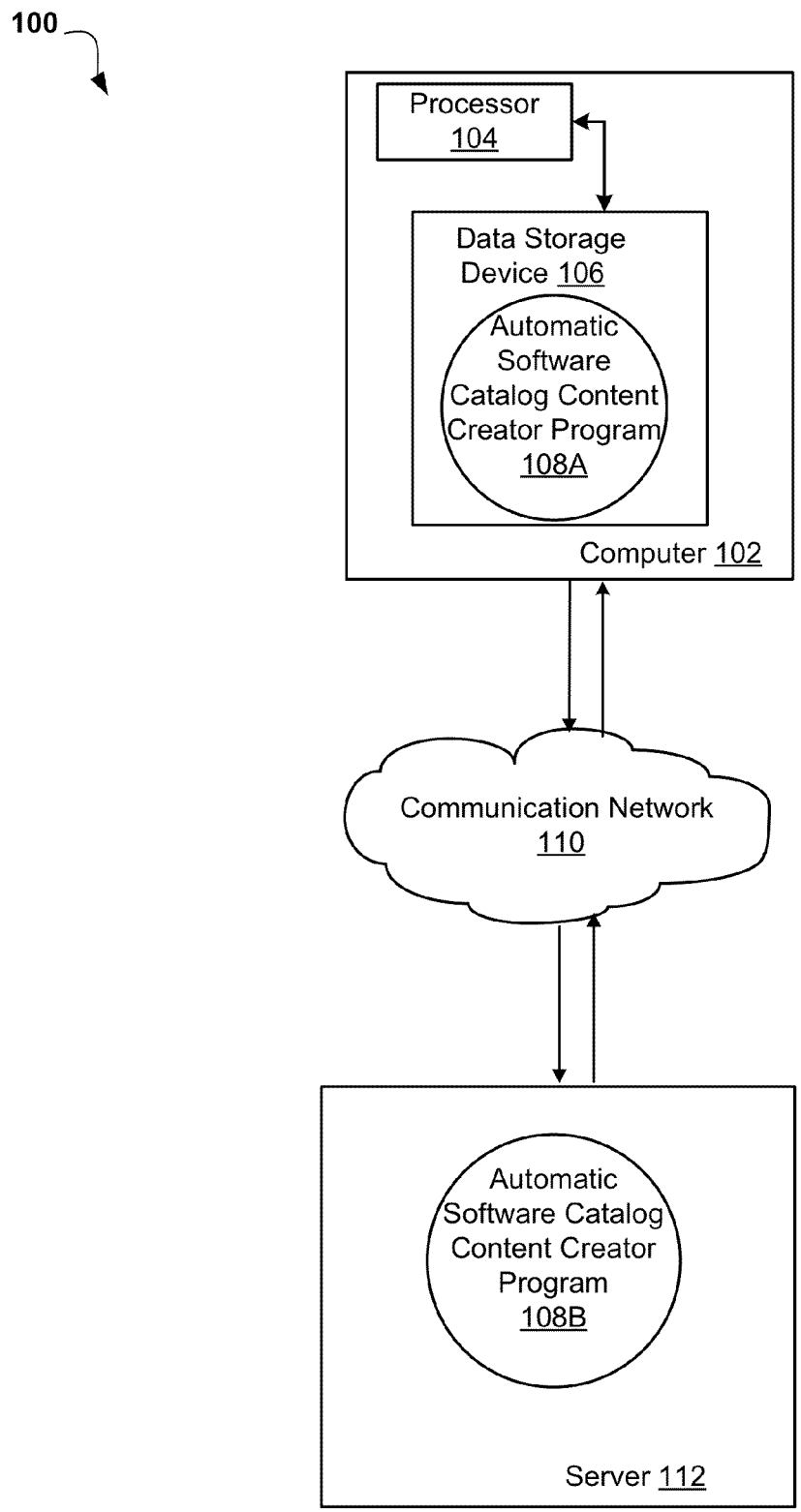
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to software products catalog content. The following described exemplary embodiments provide a system, method and program product to, among other things, provide automatic software catalog content creation based on bio-inspired computing prediction.

As previously described with respect to software catalogs, most of the currently used software asset management (SAM) solutions use some form of software catalog containing signature definitions that allow for software discovery. Some software vendors may have internal processes that may automatically build the catalog content for their software. However, most of the software is not catalogued in any way and the majority of the content for such software catalog may have to be built manually, which may be time consuming and complex. Therefore, it may be advantageous, among other things, to predict catalog content for new software releases based on existing content as well as on content change history in an automatic way.

According to at least one embodiment, catalog content may be predicted for new software releases based on existing content as well as on content change history in an automatic way. Therefore, the user may be presented with pre-evaluated signature candidates which may not require analysis or research. As such, the result may be a ready-to-use signature that was created and evaluated in the customer environment, with a list of the machines where the signature was matched. According to at least one implementation of the present embodiment, a user may confirm that the discovery based on the signature is accurate in order to automatically extend the existing catalog with the new definition. Additionally, any content created according to the present embodiment may cost significantly less than what a manual content creation may cost.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide automatic software catalog content creation based on bio-inspired computing prediction. According to at least one implementation, when a user creates a new release for a specific software product in a content catalog manager, the present embodiment may automatically perform prediction based on already existing releases of the software as well as on the change history for this specific product. Additionally, for signature creation, bio algorithms applied for sequences and alignment may be used. As such, these algorithms may be used to identify regions of similarity in proteins and may be adjusted for searching patterns in signatures based on comparison of existing signatures from previous releases.

Furthermore, for computing purposes, existing technology, such as the Needleman-Wunsch algorithm for global alignment and the Smith-Waterman algorithm for local alignment may be used. The algorithms are based on dynamic programming and based on the results of comparing old signatures. As such, the present embodiment may be able to predict next releases or version signatures by creating some accurate signatures or by creating generic signatures. These generic signatures may be used for collecting signature candidates from existing environments based on the pattern.

For example, the present embodiment may comprise of a general algorithm with the following steps:
1) A user may add a new release into the catalog e.g. SampleProduct version 5.4.
2) Assuming that there are already signatures for previous versions of this product, e.g.:
   For 5.2 version:
      file: samprod52.exe—size 23
      registry entry: /../../Sample Product/5.2
   For 5.3 version:
      file: samprod53.exe—size 45
      registry entry: /../../Sample Product/5.3
   By comparing sequences of filenames entries for 5.2 and 5.3 release it may be determined:
      samprod52.exe
      samprod53.exe
   Then, it may then be determined that there is only one mutation, so the proposed signature for version 5.4 may be named "samprod54.exe". Additionally "generic signature samprod5*.exe" may be proposed for 5.4 and all future releases.
   As such, analogically, the registry entries may be compared and produce accurate and generic registry signatures for missing product entries.
3) If some matches are found in the environment, then new signature candidates may be compared using bio algorithms with existing signatures for the particular product. As such, this comparison may assist in making a decision regarding the usefulness of a new signature. Therefore, if the result of comparison is satisfied, then the new signatures may be added into the software catalog.

According to one implementation, after such a predicted signature is created, it may be added to software catalog and propagated across the environment. Then, results of the inventory scan for such a signature may be flagged as "evaluation" and may not be shown as part of a regular inventory report, but rather may be shown in a separate panel. Furthermore, on the same panel, the user may see that the predicted signature has matched in its evaluation run on following machines across the environment. Then, the user may confirm if the prediction is accurate and then the user may accept the signature. Afterward, the prediction may be considered regular catalog content and the next scan results may show the predicted catalog content in the inventory report results.

Referring now to FIG. 1, an exemplary networked computer environment 100 in accordance with one embodiment is depicted. The networked computer environment 100 may include a computer 102 with a processor 104 and a data storage device 106 that is enabled to run an Automatic Software Catalog Content Creator Program 108A. The networked computer environment 100 may also include a server 112 that is enabled to run an Automatic Software Catalog Content Creator Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as an Automatic Software Catalog Content Creator Program 108A and 108B may run on the client computer 102 or on the server computer 112. The Automatic Software Catalog Content Creator Program 108A, 108B may automatically predict software catalog content for new software releases based on existing content as well as on content change history. The Automatic Software Catalog Content Creator method is explained in further detail below with respect to FIG. 2.

Figure 2:
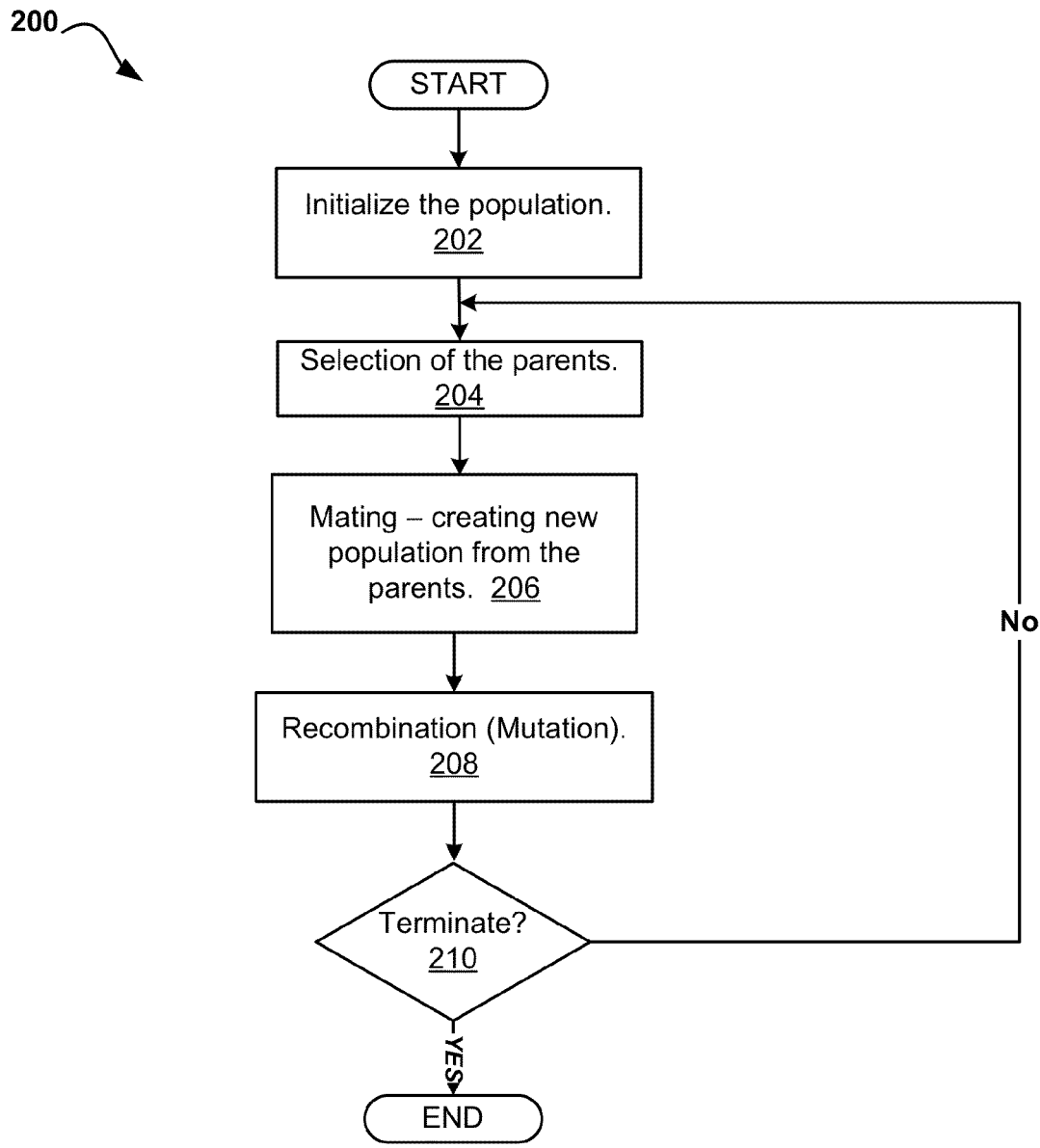
FIG. 2 is an operational flowchart illustrating the steps carried out by a program (i.e., a genetic algorithm) to create automatic software catalog content based on bio-inspired computing prediction according to at least one embodiment.

FIG. 2, an operational flowchart 200 illustrating the steps carried out by a program (i.e., a genetic algorithm) to create automatic software catalog content based on bio-inspired computing prediction in accordance with one embodiment is depicted. According to the present embodiment, the Automatic Software Catalog Content Creator Program 108A, 108B (FIG. 1) may automatically run when a user creates a new release for a specific software product in the user's catalog content manager. As such, the Automatic Software Catalog Content Creator Program 108A, 108B (FIG. 1) may automatically perform prediction based on already existing releases of the software as well as on change history for the specific product. According to at least one implementation, a genetic algorithm (i.e., the Automatic Software Catalog Content Creator Program 108A, 108B (FIG. 1)) may be applied to find the signature for the new release based on the existing catalog content and existing registry entries. For example purposes only, it may be assumed that the Automatic Software Catalog Content Creator Program 108A, 108B (FIG. 1) may be searching for the file signature (e.g., file version, file name, or file release); however, analogically, registry entries may be compared as well. Registry entries may, for example include keys and values pertaining to the specific software applications running on the platform.

Referring now to FIG. 2 at 202, the population may be initialized. As such a population of potential signatures (e.g., software version, software release, software name, or registry entry) may be created. For example, according to the present embodiment, the population may include the whole existing catalog signatures, or the population may include the signatures for a specific product, if the signature for the specific product is to be determined. According to one implementation, the whole set of specific files from the environment used for new potential signatures verification is needed. Therefore, the files which exist in the catalog should be removed from the set so that the files which exist are not to be found by potential signatures. Additionally, there may be a catalog of signatures applied for specific product releases or versions which may be the input for initial population. By exploring the existing catalog content, some potential signatures may be created for the initial population.

Next, at 204, the method may select the parents. For example, based on the ranking of the parents, the method may select the best candidates for the next generation. According to at least one implementation of the present embodiment, different existing techniques may be utilized (e.g., roulette or tournament with) for the selection of the parents. As a result of this step, only signatures for potential existing products may be chosen due to their highest ratio value. For example, a genetic representation of the solution domain may be as follows:

a) The spice may be represented as a sequence of alphanumerical characters, e.g. CCLW0501.SYS, IBMOPMEI0401.SYS2, OPMLUWEE0401.SYS2 b) A fitness function to evaluate the solution domain may be as follows:

For the solution evaluation, existing technology, such as Levenshtein distance; Damerau-Levenshtein distance; longest common subsequence (LCS) distance; Hamming distance; and Jaro-Winkler distance may be used to measure the similarity between two strings. Such existing technology may allow for the identification of the species which are the most similar to the set of signatures located on the file system.

For example for the following signatures: WASBASE00600.sys2, WASBASE00701.sys2 two changes are required; therefore, 2 is the distance between the strings, which is 11.76% of the longer length.

Then at 206, mating may be performed. As such, a new population of best-fit signatures may be created based on the parents chosen (i.e., selected) in the previous step 204. Therefore, the new population may be created based on the highest ratio value of the parents (i.e., the highest probability of being in the next population).

Next at 208, the method may perform recombination (i.e., crossover or mutation). According to the present embodiment, there may be two basic genetic operators of recombination: mutation and crossover. Crossover is a genetic operator used to vary the programming of a chromosome or chromosomes from one generation to the next. It is analogous to reproduction and biological crossover, upon which genetic algorithms are based. Crossover is a process of taking more than one parent solutions and producing a child solution from them. Mutation alters one or more gene values in a chromosome from its initial state. In mutation, the solution may change entirely from the previous solution. However, in most cases where a signature name for a successor version of the product has common parts, the crossover genetic operator may not be applicable. Therefore, for example purposes only, mutation of some characters in the signatures may be applied. As such, the present embodiment may breed new species (i.e., new signatures) through recombination as crossover (when applicable) and mutation operations to create a new offspring of signatures.

Then at 210, it may be determined as to whether the method should terminate. According to the present embodiment, there may be different stop conditions for the genetic algorithms. For example, according to one implementation, one stop condition may be when the perfect match is found, then it may be determined that there is a potential signature candidate for the new product. However, a second potential stop condition may be to stop counting after some amount of time has lapsed or iterations have been performed. Then, the best signature candidates may be compared with files from the environment. Therefore, the signature with the highest ratio may determine which file may be a good signature.

If at 210 it is determined that the method should terminate, then the method will end. However, if at 210, it is determined that the method should not terminate, then the method may continue back to step 204 to perform the selection of the parents as previously described.

According to at least one implementation, when some matches are found in the environment, then new signature candidates may be calculated using a genetic-evolution-process type prediction algorithm with existing signatures for the particular product. As such, the comparison may aide in making a decision concerning the usefulness of the new signature. Therefore, if the result of the comparison is satisfied then the new signature may be added into the software catalog. After such a predicted signature is created, the predicted signature may be added to the software catalog and propagated across the environment. Then results of the inventory scan for such a predicted signature may be flagged as "evaluation" and not shown as regular inventory on the report, but may rather be shown in a separate panel. Therefore, on the same panel, the user may see that the predicted signature has matched in its evaluation run on certain machines across the environment. Next, the user may have to confirm if the prediction is accurate and the user may accept the signature. Then, afterwards, the prediction may be considered regular catalog content and the next scan results would show in the inventory report results.

It may be appreciated that FIG. 2 provides only an illustration of one implementation and does not imply any limitations with regard to how different embodiments may be implemented. Many modifications to the depicted environments may be made based on design and implementation requirements. For example, as previously explained, the genetic algorithm described with respect to FIG. 2, may be looking for a file signature, however, analogically, registry entries may be compared as well.

Figure 3:
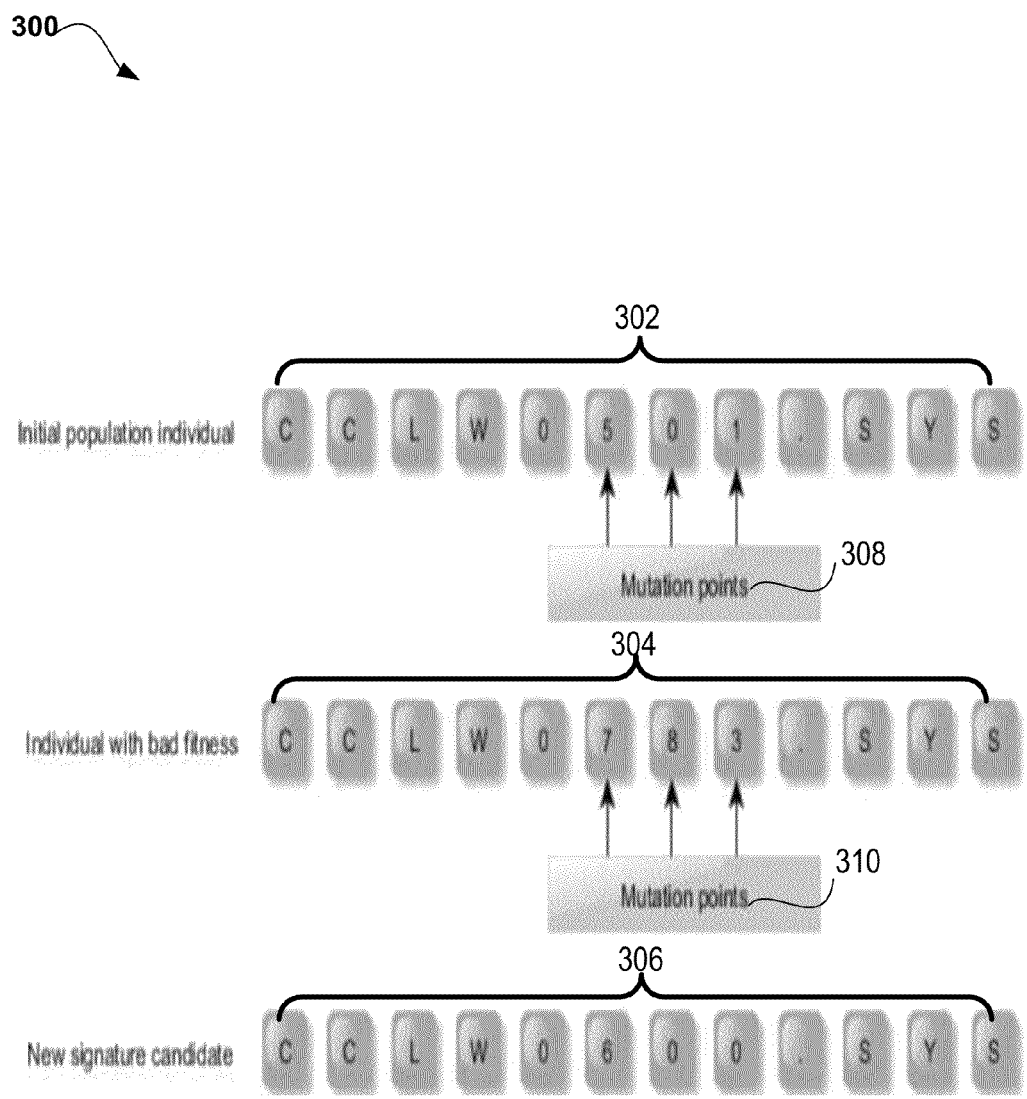
FIG. 3 is an example of a mutation of signature individuals in the genetic algorithm according to at least one embodiment.

Referring now to FIG. 3, an example of a mutation of signature individuals in the genetic algorithm 300 in accordance with one embodiment is depicted. As previously described, implementations of the present embodiment may include an initial population of a signature name 302 with mutation points 308. According to one implementation of the present embodiment, the mutation points 308 may illustrate certain characters in a filename that may be able to be replaced by other characters. After the mutation process (step 208 (FIG. 2) previously described) is performed, a new file name 304 may be generated and assessed. For example, the new file name 304 may be assessed as having bad fitness with respect to the mutation points 310, and therefore, may not be selected as a potential new signature candidate. However, as previously explained, when a perfect match is found following the assessment process, a potential new signature candidate 306 for the new product may be selected. Matches may be found in the environment (by looking for the most similar match) and the new signature candidates 306 may be compared using fitness functions (e.g., Damerau-Levenshtein distance) with existing signatures for the particular product. Such a comparison may aide in make a decision concerning the usefulness of the new signature 306. Therefore, if the result of the comparison is satisfied then the new signature 306 may be added into the software catalog. After such a predicted signature 306 is created, the predicted signature 306 may be added to software catalog and propagated across the environment.

Figure 4:
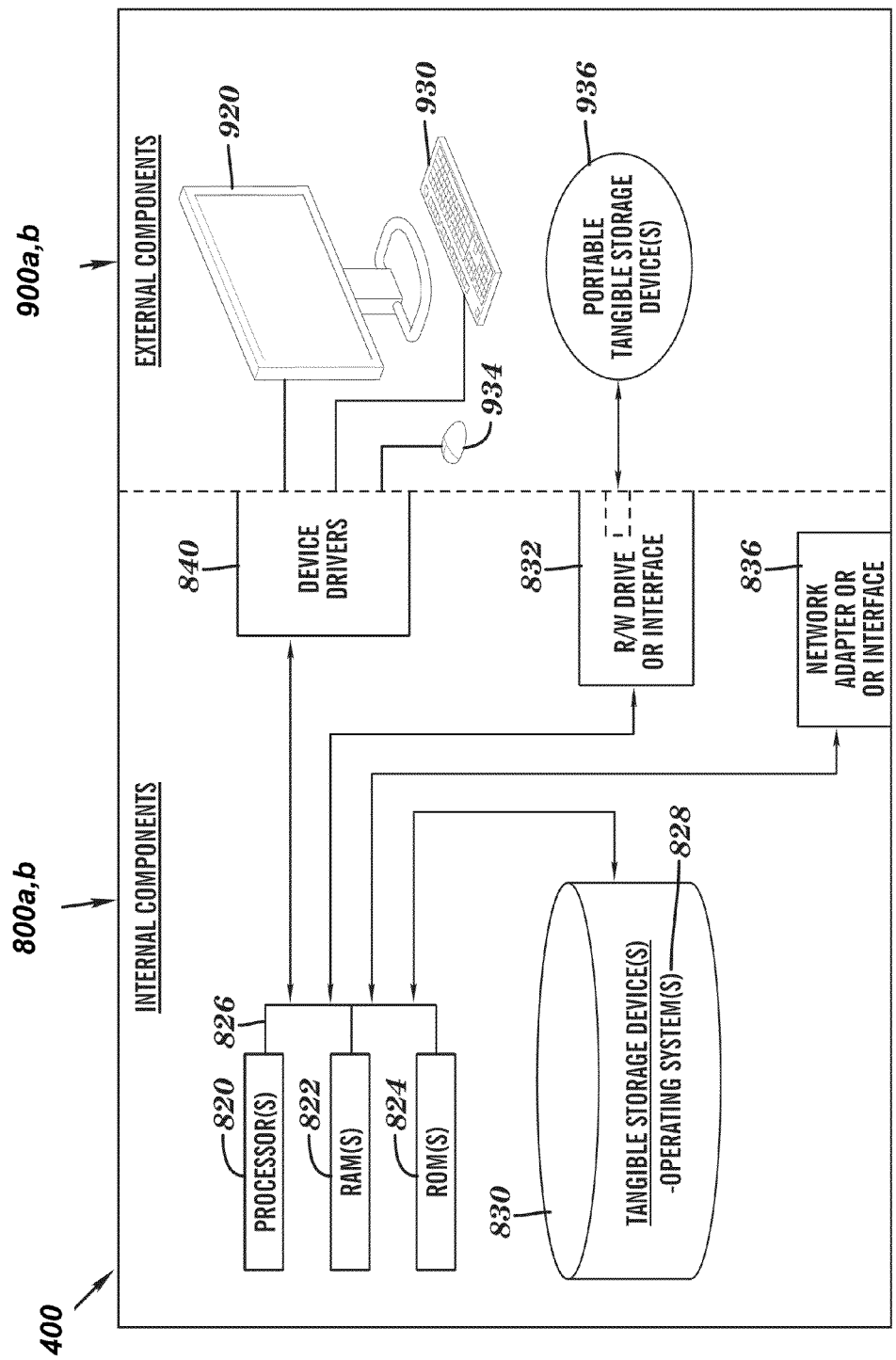
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Automatic Software Catalog Content Creator Program 108A (FIG. 1) in client computer 102 (FIG. 1) and Automatic Software Catalog Content Creator Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Automatic Software Catalog Content Creator Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Automatic Software Catalog Content Creator Program 108A (FIG. 1) in client computer 102 (FIG. 1) and Automatic Software Catalog Content Creator Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Automatic Software Catalog Content Creator Program 108A (FIG. 1) in client computer 102 (FIG. 1) and the Automatic Software Catalog Content Creator Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for automatically creating a software catalog content that includes a plurality of software components associated with a computing system, the method comprising:
    detecting, by a processor, a new release for a specific software product in a software catalog content manager that manages the plurality of software components associated with the computing system;
    creating a population comprising a plurality of potential software signatures associated with the plurality of software components based on the detection of the new release for the specific software product in the software catalog content manager, wherein the population comprising the potential software signatures includes a software version, a software release, a software name, and a registry entry;
    ranking the population comprising the potential software signatures based on a highest ratio value;
    selecting a set of parent software signatures based on the ranking;
    creating a new population of potential software signatures based on the selected set of parent software signatures;
    performing recombination on the new population of potential software signatures, wherein recombination is performed using a mutation operation; and
    predicting at least one potential software signature from the new population of potential software signatures based on a comparison between the performed recombination and the created new population of potential software signatures.

2. The method of claim 1 further comprising:
    evaluating the at least one predicted potential software signature against a user environment data; and
    adding the at least one predicted potential software signature to the software catalogue based on the evaluation.

3. The method of claim 1, wherein the ranking of the plurality of potential software signatures comprise using at least one bio algorithm to determine the highest probability of the at least one potential software signature being in the next population.

4. The method of claim 2, wherein the evaluating the at least one predicted potential software signature comprises propagating the at least one selected potential software signature across the user environment data and querying a user as to whether the predicted potential software signature should be added to the software catalogue.

5. The method of claim 1, wherein the predicting the at least one potential software signature comprises a calculation based on a genetic-evolution-process type prediction algorithm.

6. The method of claim 1, wherein the created population of potential software signatures comprise a subset of an existing software catalogue.

\* \* \* \* \*